United States Patent
Barlow et al.

[11] Patent Number: 5,535,931
[45] Date of Patent: Jul. 16, 1996

[54] STORAGE SYSTEM

[75] Inventors: John R. Barlow; Russell S. Stephanchick, both of Holland, Mich.

[73] Assignee: Prince Corporation, Holland, Mich.

[21] Appl. No.: 352,544

[22] Filed: Dec. 9, 1994

[51] Int. Cl.$^6$ ........................................ B60R 9/00
[52] U.S. Cl. .................. 224/404; 224/539; 224/540; 224/543; 224/403; 296/37.1; 296/37.6
[58] Field of Search .................... 224/402, 403, 224/404, 539, 540, 543, 553, 564, 571, 42.11, 927, 311; 296/37.1, 37.4, 37.5, 37.8; 220/287, DIG. 19

[56] References Cited

U.S. PATENT DOCUMENTS

| | | |
|---|---|---|
| D. 238,771 | 2/1976 | Spokus, Sr. . |
| D. 249,671 | 9/1978 | VanderWaal . |
| D. 266,457 | 10/1982 | Johnson . |
| D. 267,753 | 2/1983 | Urban . |
| D. 279,664 | 7/1985 | Waters, Jr. . |
| D. 299,186 | 1/1989 | Sills . |
| D. 320,372 | 10/1991 | Alberts . |
| 930,410 | 8/1909 | Noonan . |
| 1,280,761 | 10/1918 | Kirkpatrick et al. . |
| 2,051,265 | 8/1936 | Martin . |
| 2,347,002 | 4/1944 | Schofield . |
| 3,309,135 | 3/1968 | Jannetto . |
| 3,722,946 | 3/1973 | Cary ......................................... 224/543 |
| 3,727,971 | 4/1973 | Sisler ........................................ 224/404 |
| 3,759,669 | 9/1973 | Bennet . |
| 4,266,821 | 5/1981 | Gillet ........................................ 224/404 |
| 4,501,457 | 2/1985 | Pond ......................................... 224/553 |
| 4,540,213 | 9/1985 | Herlitz et al. . |
| 4,660,880 | 1/1988 | Bensch . |
| 4,718,584 | 1/1988 | Schoeny . |
| 4,733,898 | 3/1988 | Williams ................................ 224/404 |
| 4,750,774 | 6/1988 | Pickering ................................ 224/402 |
| 4,974,765 | 12/1990 | Marchetto et al. ................... 224/42.11 |
| 5,025,964 | 6/1991 | Phirippidis . |
| 5,094,375 | 3/1992 | Wright . |
| 5,129,612 | 7/1992 | Bertram . |
| 5,161,700 | 11/1992 | Stannis et al. . |
| 5,201,561 | 4/1993 | Brown ..................................... 296/37.5 |
| 5,234,116 | 8/1993 | Kristinsson et al. . |
| 5,253,913 | 10/1993 | Metivier . |
| 5,303,969 | 4/1994 | Simnacher ............................. 224/543 |
| 5,398,987 | 3/1995 | Sturgis ................................... 224/404 |

FOREIGN PATENT DOCUMENTS

| | | |
|---|---|---|
| 2616426 | 11/1977 | Germany . |
| 2741111 | 3/1979 | Germany ................................ 224/311 |
| 3238908 | 4/1984 | Germany . |
| 1186444 | 7/1989 | Japan . |

*Primary Examiner*—Henry J. Recla
*Assistant Examiner*—Gregory M. Vidovich
*Attorney, Agent, or Firm*—Price, Heneveld, Cooper, DeWitt & Litton

[57] ABSTRACT

A storage system for a vehicle having a floor and a wheel well defined in the floor includes a compartment-defining structure having a pivot for pivotally attaching the structure to the vehicle for movement between a first position wherein the structure straddles the wheel well and a second position wherein the structure is located generally adjacent the wheel well on the vehicle floor. A compartment defined by the compartment-defining structure is accessible in one or both of the first and second positions. In one aspect, the compartment-defining structure includes a curved sidewall shaped to be mateably positioned over the wheel well when in said first position, and an outer sidewall spaced from the curved sidewall defining one or more compartments between the two sidewalls. In another aspect, the compartment-defining structure includes an elastic fence allowing access to the compartments in the compartment-defining structure when in the raised position. In other aspects, a box-shaped mounting structure is fixedly attached over the wheel well and the compartment-defining structure is pivotally attached to the mounting structure. In still other aspects, an access opening is located in both sides of the compartment-defining structure to provide access to the compartment when in either the first or second positions.

15 Claims, 2 Drawing Sheets

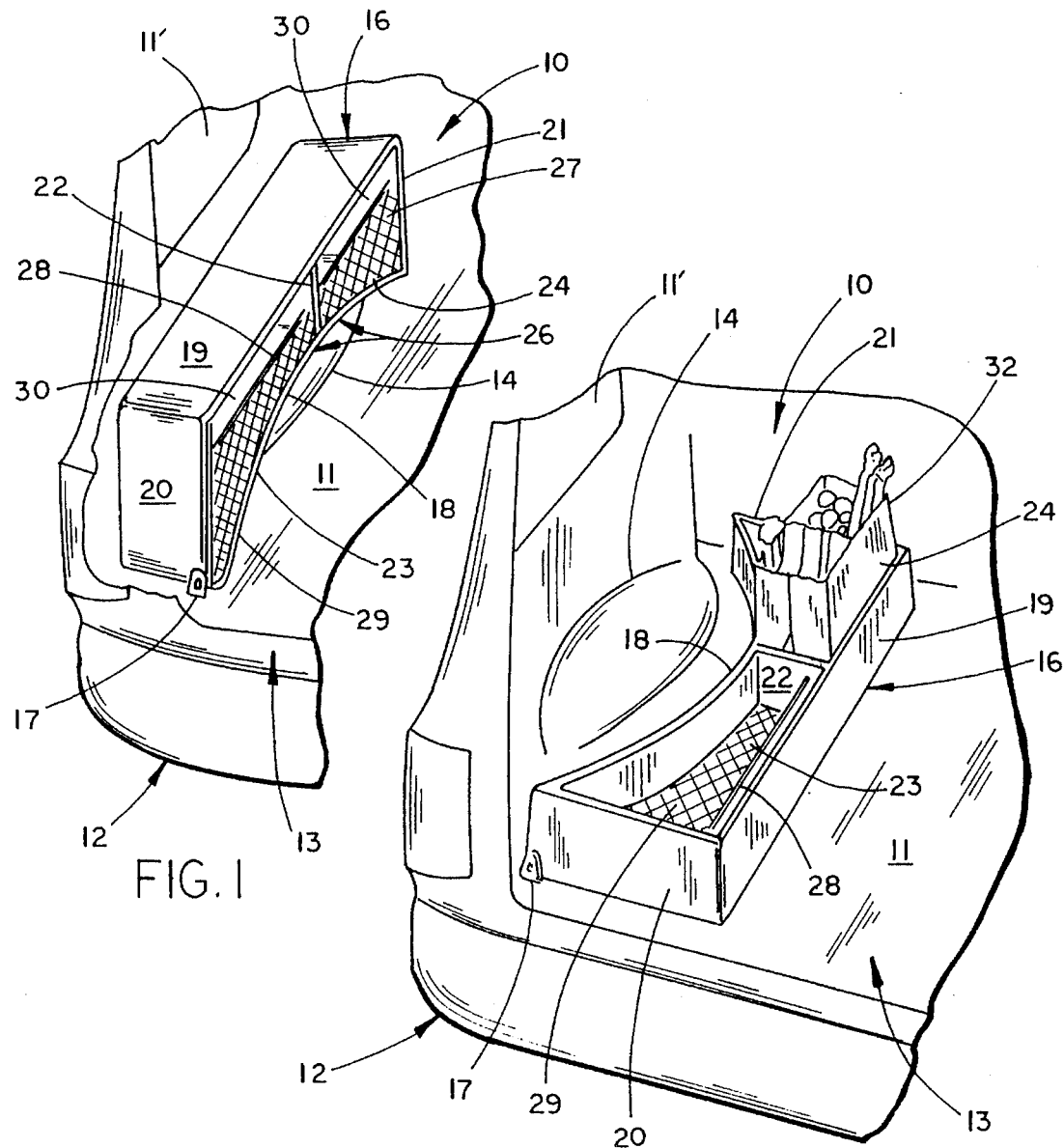
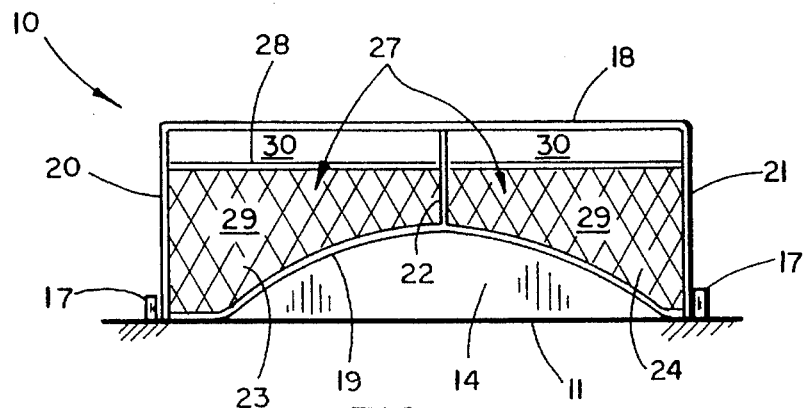

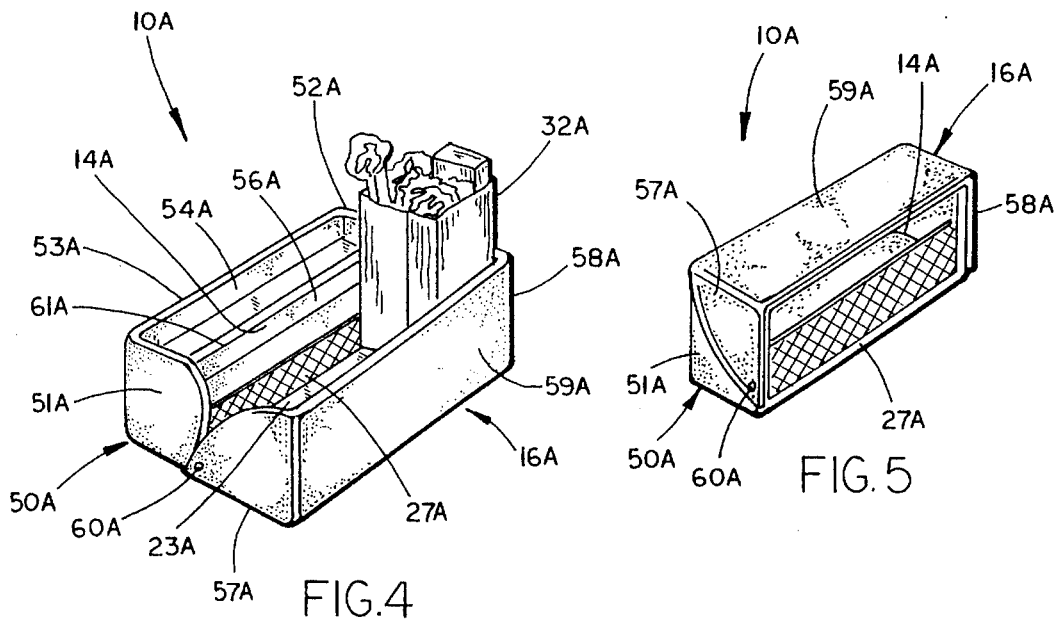
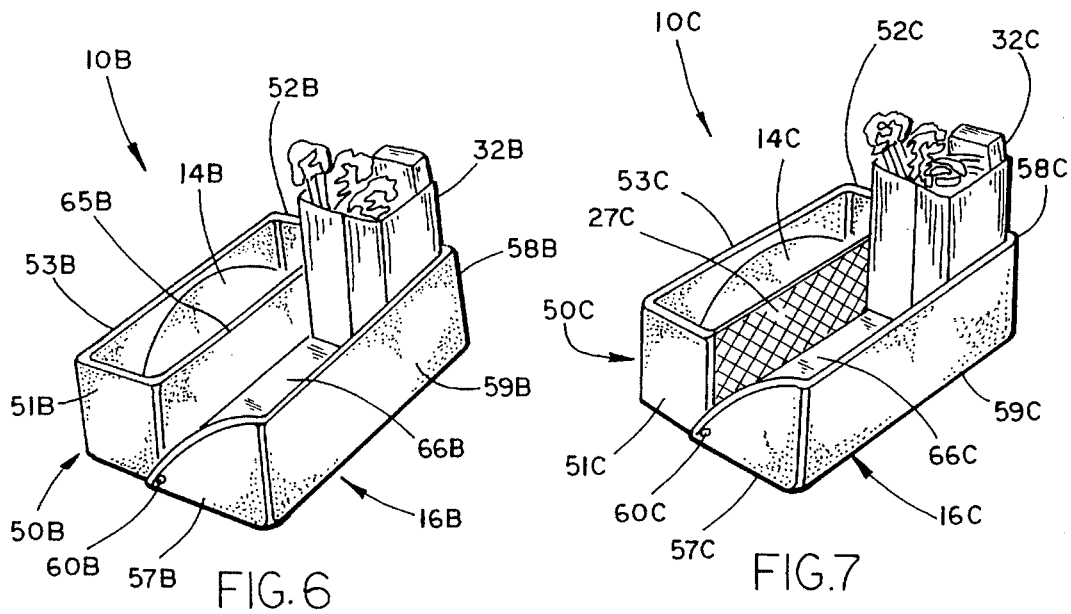

STORAGE SYSTEM

BACKGROUND OF THE INVENTION

The present invention relates to vehicle storage systems, and more particularly a storage system to efficiently use the space in a vehicle passenger compartment around a rear wheel well of a vehicle.

Vehicles are frequently used to transport goods such as groceries, packages, and sundry other items. It is important to prevent the goods from sliding around in the vehicle during transport for safety reasons as well as preventing spilling or damaging of the goods. Many different storage systems have been suggested to solve this problem, however, they do not address the unique opportunity of using the wheel well area of a vehicle for such a solution. Storage systems must provide storage compartments large enough to hold the goods easily, but must not be located in the way during "normal" use of the vehicle. One area in particular that has historically not been efficiently used is the area around a rear wheel well of a vehicle. One reason is the "odd" arcuate shape of the wheel well does not provide a flat surface for storage of goods. Some storage systems have been designed around wheel wells, however, storage systems providing greater access and which provide increased flexibility of use are desired. Thus, a storage system solving the aforementioned problems and utilizing the wheel well are of a vehicle is desired.

SUMMARY OF THE INVENTION

The system of the present invention provides a storage system for a vehicle having a floor and a wheel well extending from the floor. The storage system includes a compartment-defining structure pivotally coupled to the vehicle for movement between a first position wherein the structure straddles and is located generally over the wheel well, and a second position wherein the structure is located generally adjacent the wheel well and supported on the floor. The compartment-defining structure includes a first sidewall shaped to be mateably extend over the wheel well when in the first position and a second sidewall spaced from said first sidewall to define an open compartment with the sidewall when in the second position.

These and other features, advantages and objects of the present invention will be further understood and appreciated by those skilled in the art by reference to the following specification, claims and appended drawings.

BRIEF DESCRIPTION OF THE DRAWINGS

FIG. 1 is a fragmentary perspective view of a vehicle including a storage system embodying the present invention, the storage system being shown in a first position;

FIG. 2 is a fragmentary perspective view of the storage system shown in FIG. 1 moved to a second position;

FIG. 3 is a side elevational view of the storage system shown in FIG. 1;

FIG. 4 is a perspective view of an alternative embodiment of the storage system of the present invention shown in a use position;

FIG. 5 is a perspective view of the storage system shown in FIG. 4, shown in a stored position;

FIG. 6 is a perspective view of another embodiment of a storage system embodying the present invention; and FIG. 7 is a perspective view of yet a further embodiment of the storage system embodying the present invention.

DETAILED DESCRIPTION OF PREFERRED EMBODIMENTS

FIG. 1 shows a vehicle 12 such as a van or utility vehicle storage system 10 (FIGS. 1–4) embodying the present invention. The storage system 10 is mounted to the floor 11 of the vehicle 12 in the rear storage area 13 of the vehicle passenger compartment immediately adjacent a wheel well 14. Storage system 10 includes a compartment-defining structure 16 attached by pivot mounts 17 to floor 11 for movement between a first stored position (FIG. 1) in which the structure 16 is positioned above and straddles the wheel well 14, and a second "use" position (FIG. 2) in which the structure 16 is located adjacent the side of wheel well 14 on the floor 11 of the vehicle 12. The compartment-defining structure 16 defines vertically opening compartments 23 and 24 when in the second position (FIG. 2), and further defines a laterally oriented second opening 26 (FIG. 1) for laterally accessing compartments 23 and 24 when in the first position on opposite sides of openings 23 and 24. An elastic fence 27 extends between end walls 20 and 21 of structure 16 to substantially cover opening 26 and to hold items stored in compartments 23 and 24 behind the fence 27 in compartments 23 and 24 when structure 16 is in the stored position (FIG. 1).

The compartment-defining structure 16 (FIG. 2) includes a curved sidewall 18 juxtaposed over the wheel well 14 when in the first position. A generally planar outer sidewall 19 is spaced from the first sidewall 18 and is connected thereto by end walls 20 and 21. An intermediate divider wall 22 extends between sidewalls 18 and 19 and subdivides the area between walls 18 and 19 into the two compartments 23 and 24. Outer sidewall 19 can be positioned at various distances from inner curved wall 18. In the illustrated storage system 10, sidewall 19 is located close enough to floor 11 so that visibility through the rear side window 11' of the vehicle is not obstructed by structure 16. Openings 23, 24 and 26 are defined by the edges of walls 18–22, which edges can include flanges (not specifically shown) to help retain items in compartments 23 and 24 if desired, although this is not required. Compartments 23 and 24 are located proximate the rear of the vehicle 12 so that items such as grocery bags 32 and the like can be readily positioned therein through a rear door of the vehicle.

Fence 27 extends between walls 20, 21 and 22 across opening 26. The bottom of fence 27 is connected to curved sidewall 18, and an elastic cord 28 extends between walls 20 and 21 and between walls 21 and 22 along a top of fence 27. Cord 28 is secured to fence 27 and supports the netting 29 comprising the body of fence 27. Cord 28 extends generally parallel outer sidewall 19 and is spaced from outer sidewall 19 to define an open space 30 (FIG. 3). Fence 27 including cord 28 can be resiliently flexed to enlarge space 30 if desired, so that relatively large items can be moved through space 30 into compartments 23 or 24. Fence 27 not only retains items placed in compartments 23 and 24 when structure 16 is in the "stored" position (FIG. 1), but also serves as a floor for compartments 23 and 24 when structure 16 is in the "open" position resting on the floor (FIG. 2).

Modified storage systems 10A (FIGS. 4–5), 10B (FIG. 6) and 10C (FIG. 7) are also described hereinafter. In modified storage systems 10A, 10B and 10C, identical or comparable components and features are identified using identical numbers but with the addition of the letters "A," "B" and "C."

Modified storage system 10A (FIG. 4) includes a box-like mounting structure 50A fixedly secured to a vehicle and is configured to straddle wheel well 14A. System 10A further includes a mating box-like compartment-defining structure 16A. Mounting structure 50A includes end walls 51A and 52A positioned on opposite sides of wheel well 14A and a transverse wall 53A interconnecting end walls 51A and 52A. An elongated tray 54A further interconnects walls 51A, 52A and 53A, tray 54A being located generally over wheel well 14A. A fence 27A extends between end walls 51A and 52A partially covering the opening. 56A defined in the side of mounting structure 50A.

Compartment-defining structure 16A is C-shaped, and includes end walls 57A and 58A interconnected by transverse wall 59A, walls 57A, 58A and 59A defining compartment 23A. End wall 57A is pivotally secured to end wall 51A by a pivot pin 60A. End wall 58A is also connected to end wall 52A by a pivot pin similar to pivot pin 60A. End walls 57A and 58A extend vertically in the opened position so that a bag of groceries 32A or the like can be supported in the compartment 24A defined by walls 57A, 58A and 59A. Notably, the outer edge 61A of tray 54A and also elastic fence 27A also help support the bag of groceries 32A. End walls 51A and 52A further extend above pivot pins 60A and overlap end walls 57A and 58A to support grocery bag 32A. Intermediate walls (not shown) subdividing compartment 23A can be provided as long as the additional intermediate walls do not interferingly engage tray 54A or fence 27A when compartment-defining structure 16A is pivoted into the raised stored position against mounting structure 50A. It is contemplated that a second fence can be attached to the outer edges of end walls 57A and 58A on compartment-defining structure 16A, or alternatively, fence 27A can be removed from mounting structures 50A and attached between end walls 57A and 58A.

A second modified storage system 10B (FIG. 6) includes a box-like mounting structure 50B with walls 53B and 65B that extend between the outer edges of end walls 51B and 52B. Wall 65B eliminates the need for a fence, however, it is noted that a fence can be attached to the side of wall 65B adjacent wall 65B to hold small items thereagainst if desired. A second wall 66B extends between end walls 57B and 58B pivotably coupled to walls 51B and 52B and forms a floor for supporting items 32B in compartment 23B when in the open, floor supported position. Sidewall 59B is coupled to walls 57B, 58B and 66B to complete the storage bin so defined.

A third modified storage system 10C (FIG. 7) is similar to storage system 10B except that the transverse wall 65B is replaced with a flexible fence 27C that extends from the top to the bottom of end walls 51C and 52C.

Thus, various storage systems for storing and holding items proximate a rear wheel well of a vehicle are provided by the present invention. The storage systems move between a first position straddling a vehicle rear wheel well and a lowered position wherein open compartments are defined adjacent the wheel well on the floor of the vehicle. In several forms, the compartments are accessible in both the closed and open positions. From the foregoing description, it will be readily appreciated by those skilled in the art that modifications may be made to the invention without departing from the concepts disclosed herein. Such modifications are to be considered as covered by the appended claims, unless these claims by their language expressly state otherwise.

The embodiments of the invention in which an exclusive property or privilege is claimed are defined as follows:

1. A storage system for a vehicle having a floor and a wheel well extending upwardly therefrom defined in the floor, comprising:

a compartment-defining structure including a pivot for pivotally attaching said compartment-defining structure to the vehicle for movement between a first position wherein said compartment-defining structure is adapted to straddle and be located generally over the wheel well, and a second position wherein said compartment-defining structure is adapted to be located generally adjacent the wheel well on the floor, said compartment-defining structure including a first sidewall shaped to be mateably positioned over the wheel well when in said first position and further including a second sidewall spaced from said first sidewall that forms a compartment with said sidewall therebetween, said first and second sidewalls defining an opening for accessing said compartment when in said second position.

2. A storage system as defined in claim 1 wherein said compartment-defining structure defines a second opening for accessing said compartment when said compartment-defining structure is in said first position.

3. A storage system as defined in claim 2 including a fence partially covering said second opening for retaining items in said compartment when said compartment-defining structure is in said first position.

4. A storage system as defined in claim 3 wherein said fence includes an elastic member.

5. A storage system as defined in claim 4 wherein said fence includes a flexible netting material.

6. A storage system as defined in claim 1 including a pair of said pivots, said pivots being configured for attachment to the floor of the vehicle.

7. A storage system as defined in claim 1 including at least one divider wall extending between said first and second sidewalls for subdividing said compartment into multiple sub-compartments.

8. A storage system as defined in claim 7 wherein said divider wall defines multiple vertically facing open compartments when said storage system is in said second position.

9. A storage system as defined in claim 1 including a mounting structure for pivotally mounting said compartment-defining structure to the floor of the vehicle, said mounting structure including pivots adapted to be located on opposite sides of the wheel well.

10. A storage system as defined in claim 9 wherein said compartment-defining structure is generally box-shaped, and wherein said compartment-defining structure includes end walls pivotally interconnected to said pivots.

11. A storage system as defined in claim 10 wherein said compartment-defining structure includes a tray.

12. A storage system for a vehicle having a floor and a wheel well extending upwardly therefrom defined in the floor, comprising:

a compartment-defining structure including a mount for movably securing said structure to a vehicle for pivotal movement between a raised first position wherein said structure is adapted to straddle and be located generally over the wheel well, and a lowered second position wherein the structure is .adapted to be located generally adjacent the wheel well on the floor, said compartment-defining structure including a pair of spaced sidewalls defining a compartment therebetween and shaped to be mateably positioned proximate the wheel well when in said first position, and further defining a pair of openings on opposite sides of said compartment for accessing said compartment, one of said openings providing access to said compartment when said compartment-defining structure is in said first position and the other of said openings providing access to said compartment when said compartment-defining structure is in said second position.

13. A storage system as defined in claim 12 wherein said mount includes pivots for pivotally securing said structure to the vehicle.

14. A storage system as defined in claim 13 including an elastic member partially covering one of said pair of openings.

15. A method of storing articles in a vehicle having a floor and a wheel well extending upwardly therefrom comprising the steps of:

providing a compartment-defining structure pivotally mounted in the vehicle for movement between a raised first position straddling the wheel well in the vehicle and a lowered second position horizontally adjacent the wheel well;

accessing a compartment in the compartment-defining structure from a first side of the compartment when in said first position; and accessing said compartment in the compartment-defining structure from a second side of the compartment when in said second position, said first and second sides being located on opposite sides of said compartment-defining structure.

\* \* \* \* \*